United States Patent
Li et al.

(10) Patent No.: US 11,880,012 B2
(45) Date of Patent: Jan. 23, 2024

(54) METHOD AND APPARATUS FOR EXTRACTING DOWNGOING WAVELET AND ATTENUATION PARAMETERS BY USING VERTICAL SEISMIC DATA

(71) Applicants: CHINA NATIONAL PETROLEUM CORPORATION, Beijing (CN); BGP INC., CHINA NATIONAL PETROLEUM CORPORATION, Hebei (CN)

(72) Inventors: Yanpeng Li, Beijing (CN); Jing Wang, Beijing (CN)

(73) Assignee: CHINA NATIONAL PETROLEUM CORPORATION, Beijing (CN)

( * ) Notice: Subject to any disclaimer, the term of this patent is extended or adjusted under 35 U.S.C. 154(b) by 0 days.

(21) Appl. No.: 17/759,100

(22) PCT Filed: Jan. 19, 2021

(86) PCT No.: PCT/CN2021/072636
§ 371 (c)(1),
(2) Date: Jul. 20, 2022

(87) PCT Pub. No.: WO2021/147841
PCT Pub. Date: Jul. 29, 2021

(65) Prior Publication Data
US 2023/0041249 A1 Feb. 9, 2023

(30) Foreign Application Priority Data
Jan. 20, 2020 (CN) .......................... 202010063248.8

(51) Int. Cl.
*G01V 1/50* (2006.01)
(52) U.S. Cl.
CPC ...................................... *G01V 1/50* (2013.01)

(58) Field of Classification Search
CPC ....................................................... G01V 1/50
See application file for complete search history.

(56) References Cited

U.S. PATENT DOCUMENTS

| | | | |
|---|---|---|---|
| 6,094,620 A | 7/2000 | Gasparotto et al. | |
| 2006/0265132 A1* | 11/2006 | Rickett | G01V 1/28 |
| | | | 702/14 |
| 2012/0243373 A1 | 9/2012 | Shin | |

FOREIGN PATENT DOCUMENTS

| | | |
|---|---|---|
| CN | 102305943 A | 1/2012 |
| CN | 103353610 A | 10/2013 |

(Continued)

OTHER PUBLICATIONS

Dong et al., "Comparison of wavelet estimates from VSP and surface data", Crews Research Report, vol. 14 (2002) (Year: 2002).*

(Continued)

*Primary Examiner* — Regis J Betsch
(74) *Attorney, Agent, or Firm* — Hoffman Warnick LLC

(57) ABSTRACT

A method for extracting a downgoing wavelet and attenuation parameters from VSP data, comprising: performing upgoing and downgoing P-waves separation processing on VSP data to obtain downgoing P-wave data; performing a FFT on seismic data with a preset time window length and cut from the downgoing P-wave data to obtain FFT transformed downgoing P-wave data and a multi-trace downgoing P-wave log spectrum; subtracting a downgoing wavelet log spectrum from the multi-trace downgoing P-wave log spectrum to obtain a wavelet-corrected multi-trace downgoing P-wave log spectrum; performing a correction and an inverse FFT on the FFT transformed downgoing P-wave data to obtain a downgoing wavelet; and obtaining attenuation parameters based on P-wave first arrival time and the parameters of the wavelet-corrected multi-trace downgoing (Continued)

P-wave log spectrum. Also provided are an apparatus for extracting a downgoing wavelet and attenuation parameters from VSP data and a computer device.

9 Claims, 8 Drawing Sheets

(56) References Cited

FOREIGN PATENT DOCUMENTS

| | | | | |
|---|---|---|---|---|
| CN | 103376464 A | | 10/2013 | |
| CN | 103913770 A | | 7/2014 | |
| CN | 103995289 A | | 8/2014 | |
| CN | 104502965 A | * | 12/2014 | ............... G01V 1/28 |
| CN | 104375188 A | | 2/2015 | |
| CN | 104502965 A | | 4/2015 | |
| CN | 104570108 A | | 4/2015 | |
| CN | 104635263 A | | 5/2015 | |
| CN | 107356964 A | | 11/2017 | |
| CN | 107783181 A | | 3/2018 | |
| CN | 109143331 A | | 1/2019 | |
| CN | 109471162 A | | 3/2019 | |
| CN | 109669212 A | | 4/2019 | |
| WO | 2014191427 A2 | | 12/2014 | |
| WO | WO 2014/191427 | * | 12/2014 | ............... G01V 1/30 |
| WO | 2016039928 A1 | | 3/2016 | |

OTHER PUBLICATIONS

Stewart et al., "Seismic versus sonic velocities: A vertical seismic profiling study", Geophysics, vol. 49, No. 8 (Aug. 1984) (Year: 1984).*

Zhang et al., "Compensation for absorption and dispersion in prestack migration: An effective Q approach", Geophysics, vol. 78, No. 1 (Jan.-Feb. 2013) (Year: 2013).*

Zhang et al., "Interval Q inversion based on zero-offset VSP data and Applications", Applied Geophysics, vol. 11, No. 2 (Jun. 2014) (Year: 2014).*

PCT International Search Report for International Application No. PCT/CN2021/072636, dated Apr. 26, 2021, 3 pages.

Li Yanpeng et al., New Technology and Application of VSP Processing, Oil Geophysical Prospecting, Dec. 2018, 12 pages.

First Office Action dated Jan. 26, 2022 for counterpart Chinese patent application No. 202010063248.8, 17 pages.

Search report dated Jan. 26, 2022 for counterpart Chinese patent application No. 202010063248.8, 7 pages.

Zhang Gu-Lan et al., "Interval Q inversion based on zero-offset VSP data and applications, " Applied Geophysics, vol. 11, No. 2, 11 pages.

Chen Shuang-quan et al., "Application of improving surface seismic resolution using vertical-seismic-profile data," Journal of China University of Petroleum, vol. 36, No. 3, Jun. 2012, 5 pages.

Li Yuanzhong et al., "Application of VSP Well-ground Combined Seismic Exploration Technology-Taking Shulu in North China Marl exploration as an example," Oil Geophysical Prospecting, vol. 53, 10 pages.

Wang Jing et al., "Q value estimation of VSP whole well section," Oil Geophysical Prospecting, vol. 53, 9 pages.

Chinese Novelty Search Report, dated Jan. 14, 2020, 11 pages.

Extended European Search Report in EP21744583.2, dated May 24, 2023, 13 pages.

Hackert et al., "Improving Q estimates from seismic reflection data using well-log-based localized spectral correction," Geophysics, Nov. 2004, vol. 69, No. 6, pp. 1521-1529.

* cited by examiner

METHOD AND APPARATUS FOR EXTRACTING DOWNGOING WAVELET AND ATTENUATION PARAMETERS BY USING VERTICAL SEISMIC DATA

CROSS-REFERENCE TO RELATED APPLICATIONS

This application is a National Stage of International Application No. PCT/CN2021/072636, filed Jan. 19, 2021, which claims priority to Chinese Patent Application No. 202010063248.8, filed Jan. 20, 2020, both of which are hereby incorporated by reference in their entireties.

FIELD

The present disclosure relates to the field of geophysical explorations, and particularly to a method and an apparatus for extracting a downgoing wavelet and attenuation parameters from VSP data.

BACKGROUND

The borehole seismic exploration is an important part of the seismic exploration. Because seismic waves are excited or received in a well, a complex seismic wavefield can be obtained. After processing such as a wavefield separation, a certain range of seismic imaging near the well can be achieved, which provides a reliable basis for a geological interpretation and subsequent oil and gas development.

When exciting seismic waves on surface, and receiving with three-component or single-component sensors in the well, it is very helpful to estimate downgoing wavelets and calculate attenuation parameters, in which the attenuation parameters include a ture amplitude recovery factor and a Q factor. The downward wavelets are generally obtained by separating downgoing waves and superimposing the resultants. The attenuation parameters are generally obtained from the amplitudes of the downgoing waves, for the subsequent deconvolution and inverse Q filtering to improve the resolution of seismic data. However, in the above methods, a separate extraction of the downgoing wavelets is affected by the attenuation parameters, and a separate extraction of the attenuation parameters is affected by the downgoing wavelets, which leads to a low accuracy of the finally extracted downgoing wavelets and attenuation parameters.

SUMMARY

The embodiments of the present disclosure propose a method for extracting a downgoing wavelet and attenuation parameters from VSP data, which is adopted to extract the downgoing wavelets and the attenuation parameters with high accuracy, the method including:

picking up a P-wave first arrival from VSP data to obtain P-wave first arrival time;
performing upgoing and downgoing P-waves separation processing on the VSP data to obtain downgoing P-wave data;
performing a FFT on seismic data with a preset time window length starting from the P-wave first arrival time and cut from the downgoing P-wave data to obtain FFT transformed downgoing P-wave data, and obtaining a multi-trace downgoing P-wave log spectrum based on the FFT transformed downgoing P-wave data;
subtracting a downgoing wavelet log spectrum from the multi-trace downgoing P-wave log spectrum, to obtain a wavelet-corrected multi-trace downgoing P-wave log spectrum satisfying a preset requirement, the preset requirement being that a difference between parameters obtained from the multi-trace downgoing P-wave log spectrum and parameters obtained from the wavelet-corrected multi-trace downgoing P-wave log spectrum is within a preset range, the parameters including an intercept and a slope;
performing, based on the parameters obtained from the wavelet-corrected multi-trace downgoing P-wave log spectrum, an amplitude correction and an inverse FFT on the FFT transformed downgoing P-wave data to obtain a downgoing wavelet; and
obtaining attenuation parameters based on the P-wave first arrival time and the parameters obtained from the wavelet-corrected multi-trace downgoing P-wave log spectrum, the attenuation parameters including a true amplitude recovery factor and a Q factor.

The embodiments of the present disclosure further propose an apparatus for extracting a downgoing wavelet and attenuation parameters from VSP data, which is adopted to extract the downgoing wavelets and the attenuation parameters with high accuracy, the apparatus including:

a data acquisition module configured to pick up a P-wave first arrival from VSP data to obtain P-wave first arrival time; and perform upgoing and downgoing waves separation processing on the VSP data to obtain downgoing P-wave data;
a first processing module configured to perform a FFT on seismic data with a preset time window length starting from the P-wave first arrival time and cut from the downgoing P-wave data to obtain FFT transformed downgoing P-wave data, and obtain a multi-trace downgoing P-wave log spectrum based on the FFT transformed downgoing P-wave data;
a second processing module configured to subtract a downgoing wavelet log spectrum from the multi-trace downgoing P-wave log spectrum, to obtain a wavelet-corrected multi-trace downgoing P-wave log spectrum satisfying a preset requirement, wherein preset requirement is that a difference between parameters obtained from the multi-trace downgoing P-wave log spectrum and parameters obtained from the wavelet-corrected multi-trace downgoing P-wave log spectrum is within a preset range, the parameter including an intercept and a slope;
a downgoing wavelet extraction module configured to perform, based on the parameters obtained from the wavelet-corrected multi-trace downgoing P-wave log spectrum, an amplitude correction and an inverse FFT on the FFT transformed downgoing P-wave data to obtain a downgoing wavelet; and
an attenuation parameter extraction module configured to obtain attenuation parameters based on the P-wave first arrival time and the parameters obtained from the wavelet-corrected multi-trace downgoing P-wave log spectrum, the attenuation parameters including a true amplitude recovery factor and a Q factor.

The embodiments of the present disclosure further propose a computer device, including a memory, a processor and a computer program stored in the memory and executable on the processor, in which the processor is configured to execute the computer program to implement the method for extracting a downgoing wavelet and attenuation parameters from VSP data.

The embodiments of the present disclosure further propose a computer-readable storage medium, which stores a computer program for implementing the method for extracting a downgoing wavelet and attenuation parameters from VSP data.

In the embodiments of the present disclosure, a P-wave first arrival is picked up from VSP data to obtain P-wave first arrival time; upgoing and downgoing waves separation processing is performed on the VSP data to obtain downgoing P-wave data; a FFT is performed on seismic data with a preset time window length starting from the P-wave first arrival time and cut from the downgoing P-wave data to obtain FFT transformed downgoing P-wave data, and a multi-trace downgoing P-wave log spectrum is obtained based on the FFT transformed downgoing P-wave data; a downgoing wavelet log spectrum is subtracted from the multi-trace downgoing P-wave log spectrum, to obtain a wavelet-corrected multi-trace downgoing P-wave log spectrum satisfying a preset requirement, the preset requirement being that a difference between parameters obtained from the multi-trace downgoing P-wave log spectrum and parameters obtained from the wavelet-corrected multi-trace downgoing P-wave log spectrum is within a preset range, the parameters including an intercept and a slope; based on the parameters obtained from the wavelet-corrected multi-trace downgoing P-wave log spectrum, an correction and an inverse FFT are performed on the FFT transformed downgoing P-wave data to obtain a downgoing wavelet; and attenuation parameters are obtained based on the P-wave first arrival time and the parameters obtained from the wavelet-corrected multi-trace downgoing P-wave log spectrum, the attenuation parameters including a true amplitude recovery factor and a Q factor. In the above process, the downgoing wavelet log spectrum is subtracted from the downgoing P-wave log spectrum, that is, the influence of the downgoing wavelet is removed from the obtained wavelet-corrected multi-trace downgoing P-wave log spectrum, so that the attenuation parameters are not affected by the downgoing wavelet, thus improving the accuracy of the attenuation parameters. In addition, when the difference between the parameters of the multi-trace downgoing P-wave log spectrum and the parameters of the wavelet-corrected multi-trace downgoing P-wave log spectrum is within the preset range, the parameters of the wavelet-corrected downgoing P-wave log spectrum are converged. Therefore, obtaining the downgoing wavelet based on the parameters of the wavelet-corrected multi-trace downgoing P-wave log spectrum is equivalent to compensating for the downgoing wavelet, which also improves the accuracy of the downgoing wavelet.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

In the description of this specification, words such as 'include', 'comprise', 'have' and 'contain' are all open terms, which mean including but not limited to. The description of the reference terms such as 'one embodiment', 'one specific embodiment', 'some embodiments' and 'for example' means that the specific features, structures or characteristics described in connection with the embodiment (s) or example(s) are included in at least one embodiment or example of the present disclosure. In this specification, the schematic expressions of the above terms do not necessarily refer to a same embodiment or example. In addition, the described specific features, structures or characteristics may be combined in any one or more embodiments or examples in a suitable manner. The sequence of steps involved in each embodiment is used to schematically illustrate the implementation of the present disclosure, and the sequence of steps is not limited, but can be appropriately adjusted as needed.

Figure 1:
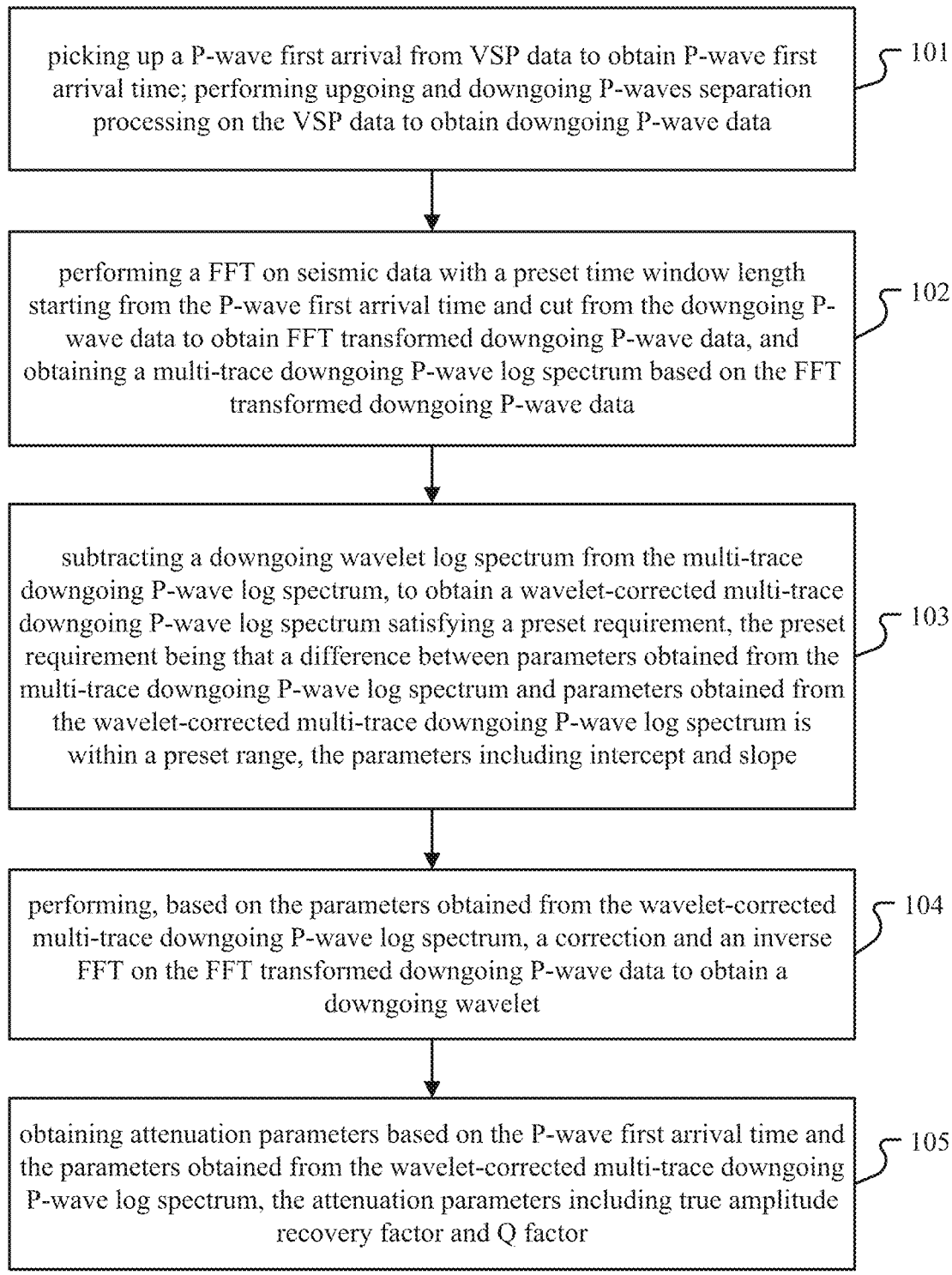
FIG. 1 is a flowchart of a method for extracting a downgoing wavelet and attenuation parameters from VSP data according to an embodiment of the present disclosure.

FIG. 1 is a flowchart of a method for extracting a downgoing wavelet and attenuation parameters from VSP data according to an embodiment of the present disclosure. As illustrated in FIG. 1, the method includes:

step 101: picking up a P-wave first arrival based on VSP data to obtain P-wave first arrival time; and performing upgoing and downgoing P-waves separation processing on the VSP data to obtain downgoing P-wave data;

step 102: performing a Fast Fourier Transform (FFT) on seismic data with a preset time window length starting from the P-wave first arrival time and cut from the downgoing P-wave data to obtain FFT transformed downgoing P-wave data, and obtaining a multi-trace downgoing P-wave log spectrum based on the FFT transformed downgoing P-wave data;

step 103: subtracting a downgoing wavelet log spectrum from the multi-trace downgoing P-wave log spectrum, to obtain a wavelet-corrected multi-trace downgoing P-wave log spectrum satisfying a preset requirement, the preset requirement being that a difference between parameters obtained from the multi-trace downgoing P-wave log spectrum and parameters obtained from the wavelet-corrected multi-trace downgoing P-wave log spectrum is within a preset range, the parameter including intercept and slope;

step 104: performing, based on the parameters obtained from the wavelet-corrected multi-trace downgoing P-wave log spectrum, an amplitude correction and an inverse FFT on the FFT transformed downgoing P-wave data to obtain a downgoing wavelet; and step 105: obtaining attenuation parameters based on the P-wave first arrival time and the parameters obtained from the wavelet-corrected multi-trace downgoing P-wave log spectrum, the attenuation parameters including true amplitude recovery factor and Q factor.

In the embodiment of the present disclosure, the downgoing wavelet log spectrum is subtracted from the downgoing P-wave log spectrum, that is, the wavelet-corrected multi-trace downgoing P-wave log spectrum is not affected by the downgoing wavelet, so that the obtained attenuation parameters are not affected by the downgoing wavelet, thus improving the accuracy of the attenuation parameters. In addition, when the difference between the parameters of the multi-trace downgoing P-wave log spectrum and the parameters of the wavelet-corrected multi-trace downgoing P-wave log spectrum is within the preset range, the parameters of the wavelet-corrected multi-trace downgoing P-wave log spectrum are converged. Therefore, obtaining the downgoing wavelet based on the parameters of the wavelet-corrected multi-trace downgoing P-wave log spectrum is equivalent to compensating for the downgoing wavelet, thereby improving the accuracy of the downgoing wavelet.

In the above embodiment, in step 101, a three-component or single-component sensor is placed into a well for a seismic wave reception, and an explosion source or an vibroseis is used on the surface or in the well for a seismic wave excitation near a wellhead, so vertical seismic profiling (VSP) data is collected; the P-wave first arrival is picked up according to the VSP data to obtain the P-wave first arrival time; upgoing and downgoing P-waves separation processing is performed on the VSP data to obtain the downgoing P-wave data; thus, the downgoing P-wave data and the P-wave first arrival time with a high accuracy can be obtained.

In one embodiment, the method further includes:
performing flattening processing on the downgoing P-wave data according to the P-wave first arrive time;
performing the FFT on seismic data with a preset time window length starting from the P-wave first arrival time and cut from the downgoing P-wave data includes:
performing a FFT on seismic data with a preset time window length starting from the P-wave first arrival time and cut from the downgoing P-wave data on which the flattening processing has been performed.

In the above embodiment, in step 102, a FFT is performed on seismic data with a preset time window length starting from the P-wave first arrival time and cut from the downgoing P-wave data on which the flattening processing has been performed; during the flattening processing, if the P-wave first arrival time is not divisible by a sampling rate, it is necessary to perform interpolation processing on the downgoing P-wave data to ensure the accuracy of a time shift. The flattening processing is performed on the downgoing P-wave data according to the P-wave first arrival time, and the downgoing P-wave data is moved upward according to the P-wave first arrival time, so that the downgoing P-waves are aligned.

When a FFT is performed on seismic data with a preset time window length starting from the P-wave first arrival time and cut from the downgoing P-wave data on which the flattening processing has been performed, firstly the FFT transformed downgoing P-wave data is obtained, and then the multi-trace downgoing P-wave log spectrum is obtained from the FFT transformed downgoing P-wave data according to the following formula:

$$A_i = \ln(\sqrt{R_i^2 + I_i^2}) \tag{1}$$

where $A_i$ is a value of an i-th trace of downgoing P-wave log spectrum; $R_i$ and $I_i$ are real and imaginary parts of i-th trace of FFT transformed downgoing P-wave data, respectively.

In one embodiment, subtracting the downgoing wavelet log spectrum from the multi-trace downgoing P-wave log spectrum, to obtain the wavelet-corrected multi-trace downgoing P-wave log spectrum includes:
performing flattening processing on each current trace of the multi-trace downgoing P-wave log spectrum using the intercept and the slope parameter to obtain flattened multi-trace downgoing P-wave log spectrum;
stacking the flattened multi-trace downgoing P-wave log spectrum to obtain a downgoing wavelet log spectrum;
subtracting the downgoing wavelet log spectrum from each current trace of downgoing P-wave log spectrum, to obtain an updated trace of downgoing P-wave log spectrum; and
replacing the current trace of downgoing P-wave log spectrum with the updated trace of downgoing P-wave log spectrum if a difference between parameters of the updated trace of downgoing P-wave log spectrum and parameters of the current trace of downgoing P-wave log spectrum is not within a preset range; iteratively performing the above steps until the difference between the parameters of the updated trace of downgoing P-wave log spectrum and the parameters of the current trace of downgoing P-wave log spectrum is within the preset range; and determining a final multi-trace downgoing P-wave log spectrum as the wavelet-corrected multi-trace downgoing P-wave log spectrum.

In the above embodiment, firstly flattening processing is performed on each current trace of the multi-trace downgoing P-wave log spectrum, specifically including:
taking a peak frequency and a high cutoff frequency of the current trace of downgoing P-wave log spectrum, and calculating a slope and an intercept of the current trace of downgoing P-wave log spectrum through the following formula:

$$G_i(A_{i,max} - A_{i,peak})/(f_{i,max} - f_{i,peak}) \tag{2}$$

$$C_i = A_{i,max} - G_{k,i} f_{i,max} \tag{3}$$

where $G_i$ is a slope of the i-th trace of downgoing P-wave log spectrum; $C_i$ is an intercept of the i-th trace of downgoing P-wave log spectrum; $f_{i,max}$ is a high cutoff frequency of the i-th trace of downgoing P-wave log spectrum; $f_{i,peak}$ is a peak frequency of the i-th trace of downgoing P-wave log spectrum; $A_{i,max}$ is an amplitude corresponding to the high cutoff frequency of the i-th trace of downgoing P-wave log spectrum; $A_{i,peak}$ is an amplitude corresponding to the peak frequency of the i-th trace of downgoing P-wave log spectrum;

performing, based on the slope and the intercept of the current trace of downgoing P-wave log spectrum, flattening and stacking processing on the current trace of downgoing P-wave log spectrum using the following formula:

$$W_j = \sum_{i=1}^{n}(A_{i,j} - (G_i \cdot f_j + C_i)) \quad (4)$$

where $W_j$ is a downgoing P-wave log spectrum of an j-th frequency point having experienced the flattening processing; $A_{i,j}$ is a downgoing P-wave log spectrum of the j-th frequency point of an i-th trace; is a frequency of the j-th frequency point; n is a total trace number of the downgoing P-wave log spectrum.

In formula (2), for the downgoing P-wave log spectrum corresponding to a frequency greater than $f_{i,max}$, $W_j$ takes a value of zero, and before that, ramp processing is performed on several points.

The downgoing P-wave log spectrum in formula (2) is stacked to obtain a downgoing wavelet log spectrum, and then the downgoing wavelet log spectrum is subtracted from the current trace of downgoing P-wave log spectrum in formula (1) to obtain an updated downgoing P-wave log spectrum. If a slope and an intercept of a previous trace of downgoing P-wave log spectrum are parameters of a 0-th iteration, then a slope and an intercept of the updated trace of downgoing P-wave log spectrum are parameters of 1-th iteration.

In order to ensure the convergence of the parameters, repeated iterations are required, i.e., the current trace of downgoing P-wave log spectrum is replaced with the updated trace of downgoing P-wave log spectrum if the difference between the parameters of the updated trace of downgoing P-wave log spectrum and the parameters of the current trace of downgoing P-wave log spectrum is not within the preset range; the above steps is iteratively performed until the difference between the parameters of the updated trace of downgoing P-wave log spectrum and the parameters of the current (previously iterated) trace of downgoing P-wave log spectrum is within the preset range; a final multi-trace downgoing P-wave log spectrum is determined as the wavelet-corrected multi-trace downgoing P-wave log spectrum, so that the difference between the parameters of the multi-trace downgoing P-wave log spectrum and the parameters of the wavelet-corrected multi-trace downgoing P-wave log spectrum is within the preset range.

If it is determined that the difference between the parameters of the updated trace of downgoing P-wave log spectrum and the parameters of the current trace of downgoing P-wave log spectrum is not within the preset range, it is possible to compare, through error analyses, whether a difference between the slope of the updated trace of downgoing P-wave log spectrum and the slope of the current trace of downgoing P-wave log spectrum is within a preset slope range, and whether a difference between the intercept of the updated trace of downgoing P-wave log spectrum and the intercept of the current trace of downgoing P-wave log spectrum is within an preset intercept range. When the above differences are both within the respective preset ranges, the iteration is stopped to obtain the final slope and intercept.

In one embodiment, performing, based on the parameters of the wavelet-corrected multi-trace downgoing P-wave log spectrum, the amplitude correction and the inverse FFT on the FFT transformed downgoing P-wave data to obtain the downgoing wavelet includes:

correcting, based on the parameters of the wavelet-corrected multi-trace downgoing P-wave log spectrum, real and imaginary parts of the FFT transformed downgoing P-wave data, to obtain corrected downgoing P-wave data;

determining a valid frequency band of the corrected downgoing P-wave data;

performing ramp processing on data points within a preset range and outside the valid frequency band;

performing zero-clearing processing on downgoing P-wave data outside the valid frequency band and the preset range to obtain final downgoing P-wave data; and performing an inverse FFT on the final downgoing P-wave data to obtain a downgoing wavelet.

In the above embodiment, for example, the wavelet-corrected multi-trace downgoing P-wave log spectrum has a slope $G_i$ and an intercept $C_i$, the real and imaginary parts of each trace of FFT transformed downgoing P-wave data are multiplied by $C_i \cdot e^{G_i \cdot f_i}$ for correction, respectively. The valid frequency band of the corrected downgoing P-wave data depends on the actual situation, and generally it is within 100 Hz. The ramp processing is performed on the data points within the preset range and outside the valid frequency band, and the zero-clearing processing is performed on the downgoing P-wave data outside the valid frequency band and the preset range to obtain the final downgoing P-wave data, so as to realize the purpose of removing the noise data and obtaining the accurate final downgoing P-wave data.

In one embodiment, obtaining attenuation parameters based on the P-wave first arrival time and the parameters of the wavelet-corrected multi-trace downgoing P-wave log spectrum includes:

determining the true amplitude recovery factor based on the P-wave first arrival time and the intercept of the wavelet-corrected multi-trace downgoing P-wave log spectrum; and obtaining the Q factor based on the P-wave first arrival time and the slope of the wavelet-corrected multi-trace downgoing P-wave log spectrum.

In the above embodiment, the P-wave first arrival time means that corresponding to each trace.

In one embodiment, determining the true amplitude recovery factor based on the P-wave first arrival time and the intercept of the wavelet-corrected multi-trace downgoing P-wave log spectrum includes:

performing linear fitting on a logarithm of the P-wave first arrival time and the intercept of the wavelet-corrected multi-trace downgoing P-wave log spectrum, to determine a slope of the linear fitting as the true amplitude recovery factor.

In the above embodiment, the following formula is used to perform linear fitting on the logarithm of the P-wave first arrival time and the intercept of the wavelet-corrected multi-trace downgoing P-wave log spectrum:

$$C_i = C_0 + TAR \cdot \ln(Tp_i) \quad (5)$$

where $C_i$ is an intercept of an i-th trace of wavelet-corrected downgoing P-wave log spectrum; $C_0$ is an intercept of an initial trace of wavelet-corrected downgoing P-wave log spectrum; TAR is a true amplitude recovery factor; $Tp_i$ is P-wave first arrival time corresponding to an i-th trace.

In one embodiment, the Q factor includes an effective Q factor and an interval Q factor;

obtaining the Q factor based on the P-wave first arrival time and the slope of the wavelet-corrected multi-trace downgoing P-wave log spectrum includes:

obtaining the effective Q factor corresponding to the trace based on the P-wave first arrival time and the slope of the wavelet-corrected downgoing P-wave log spectrum;

obtaining the interval Q factor corresponding to the trace based on the P-wave first arrival time and the effective Q factor corresponding to the trace.

In the above embodiment, the following formula is used to obtain the effective Q factor based on the P-wave first arrival time and the slope of the wavelet-corrected multi-trace downgoing P-wave log spectrum:

$$Q\text{eff}_i = \pi \cdot Tp_i/G_i \quad (6)$$

where $Q\text{eff}_i$ is an effective Q factor corresponding to an i-th trace; $G_i$ is a slope of an i-th trace of the wavelet-corrected downgoing P-wave log spectrum.

In formula (6), $G_i$ is an increasing function. Due to numerical errors, $G_i$ may fluctuate in an inverse direction. To ensure the stability of solution, multi-point smoothing processing should be performed on $G_i$ to ensure that $G_i$ is an increasing function along with the P-wave first arrival time $Tp_i$.

Then, the following formula is used to obtain the interval Q factor corresponding to the trace according to the P-wave first arrival time and the effective Q factor corresponding to the trace:

$$Qint_i = \frac{Tp_i - Tp_{i-1}}{Tp_i/Qeff_i - Tp_{i-1}/Qeff_i} \quad (7)$$

where $Qint_i$ is an interval Q factor of an i-th layer.

After the downgoing wavelet, the true amplitude recovery factor and the Q factor are obtained, the VSP seismic data can be subjected to the subsequent processing of deconvolution, amplitude recovery and inverse Q filtering, and geophysical result data for geological researches can be provided by interpretation.

Figure 2:
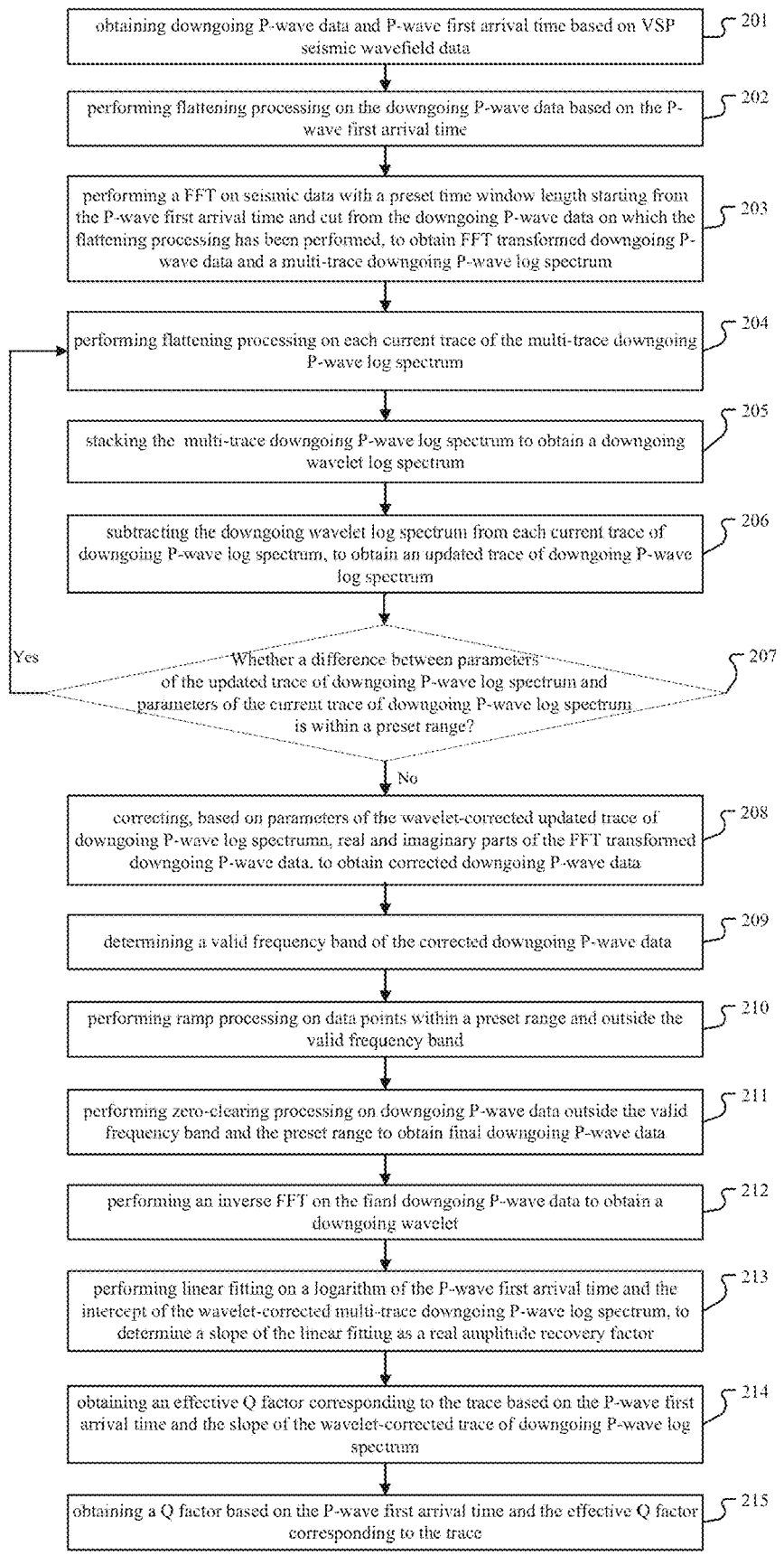
FIG. 2 is a detailed flowchart of a method for extracting a downgoing wavelet and attenuation parameters from VSP data according to an embodiment of the present disclosure.

Based on the above embodiments, the present disclosure provides an embodiment as follows to illustrate a detailed process of the method for extracting a downgoing wavelet and attenuation parameters from VSP data. FIG. 2 is a detailed flowchart of the method for extracting a downgoing wavelet and attenuation parameters from VSP data according to an embodiment of the present disclosure. As illustrated in FIG. 2, in one embodiment, a detailed flowchart of the method for extracting a downgoing wavelet and attenuation parameters from VSP data includes:

step 201: obtaining downgoing P-wave data and P-wave first arrival time based on VSP seismic wavefield data;

step 202: performing flattening processing on the downgoing P-wave data based on the P-wave first arrival time;

step 203: performing a FFT on seismic data with a preset time window length starting from the P-wave first arrival time and cut from the downgoing P-wave data on which the flattening processing has been performed, to obtain FFT transformed downgoing P-wave data and a multi-trace downgoing P-wave log spectrum;

step 204: performing flattening processing on each current trace of the multi-trace downgoing P-wave log spectrum using the intercept and the slope parameter to obtain flattened multi-trace downgoing P-wave log spectrum;

step 205: stacking the flattened multi-trace downgoing P-wave log spectrum to obtain a downgoing wavelet log spectrum;

step 206: subtracting the downgoing wavelet log spectrum from each current trace of downgoing P-wave log spectrum, to obtain an updated trace of downgoing P-wave log spectrum;

step 207: if it is determined that a difference between parameters of the updated trace of downgoing P-wave log spectrum and parameters of the current trace of downgoing P-wave log spectrum is not within a preset range, replacing the current trace of downgoing P-wave log spectrum with the updated trace of downgoing P-wave log spectrum, determining a final multi-trace downgoing P-wave log spectrum as the wavelet-corrected multi-trace downgoing P-wave log spectrum, and then turning to step 204; otherwise turning to step 208;

step 208: correcting, based on parameters of the wavelet-corrected updated trace of downgoing P-wave log spectrum, real and imaginary parts of the FFT transformed downgoing P-wave data, to obtain corrected downgoing P-wave data;

step 209: determining a valid frequency band of the corrected downgoing P-wave data;

step 210: performing ramp processing on data points within a preset range and outside the valid frequency band;

step 211: performing zero-clearing processing on downgoing P-wave data outside the valid frequency band and the preset range to obtain final downgoing P-wave data;

step 212: performing an inverse FFT on the final downgoing P-wave data to obtain a downgoing wavelet;

step 213: performing linear fitting on a logarithm of the P-wave first arrival time and the intercept of the wavelet-corrected multi-trace downgoing P-wave log spectrum, to determine a slope of the linear fitting as a true amplitude recovery factor;

step 214: obtaining an effective Q factor corresponding to the trace based on the P-wave first arrival time and the slope of the wavelet-corrected trace of downgoing P-wave log spectrum;

step 215: obtaining a Q factor based on the P-wave first arrival time and the effective Q factor corresponding to the trace.

Of course, it can be understood that the detailed flow of the method for extracting a downgoing wavelet and attenuation parameters from VSP data may also have other variations, all of which should fall within the protection scope of the present invention.

A specific embodiment is given below to illustrate the specific application of the method proposed in the embodiment of the present disclosure.

VSP seismic wavefield data collected from an oil well in eastern China is processed.

Firstly, a three-component geophone is used for a seismic wave reception, and a ground seismic source is used for a seismic wave excitation, so as to collect zero-offset VSP seismic wavefield data; a downgoing wavelet, a true amplitude recovery factor and a Q factor are simultaneously obtained from the method proposed in the embodiment of the present disclosure, and the subsequent processing is performed to achieve the purposes of suppressing the near-surface multiple waves and improving the resolution.

Figure 3:
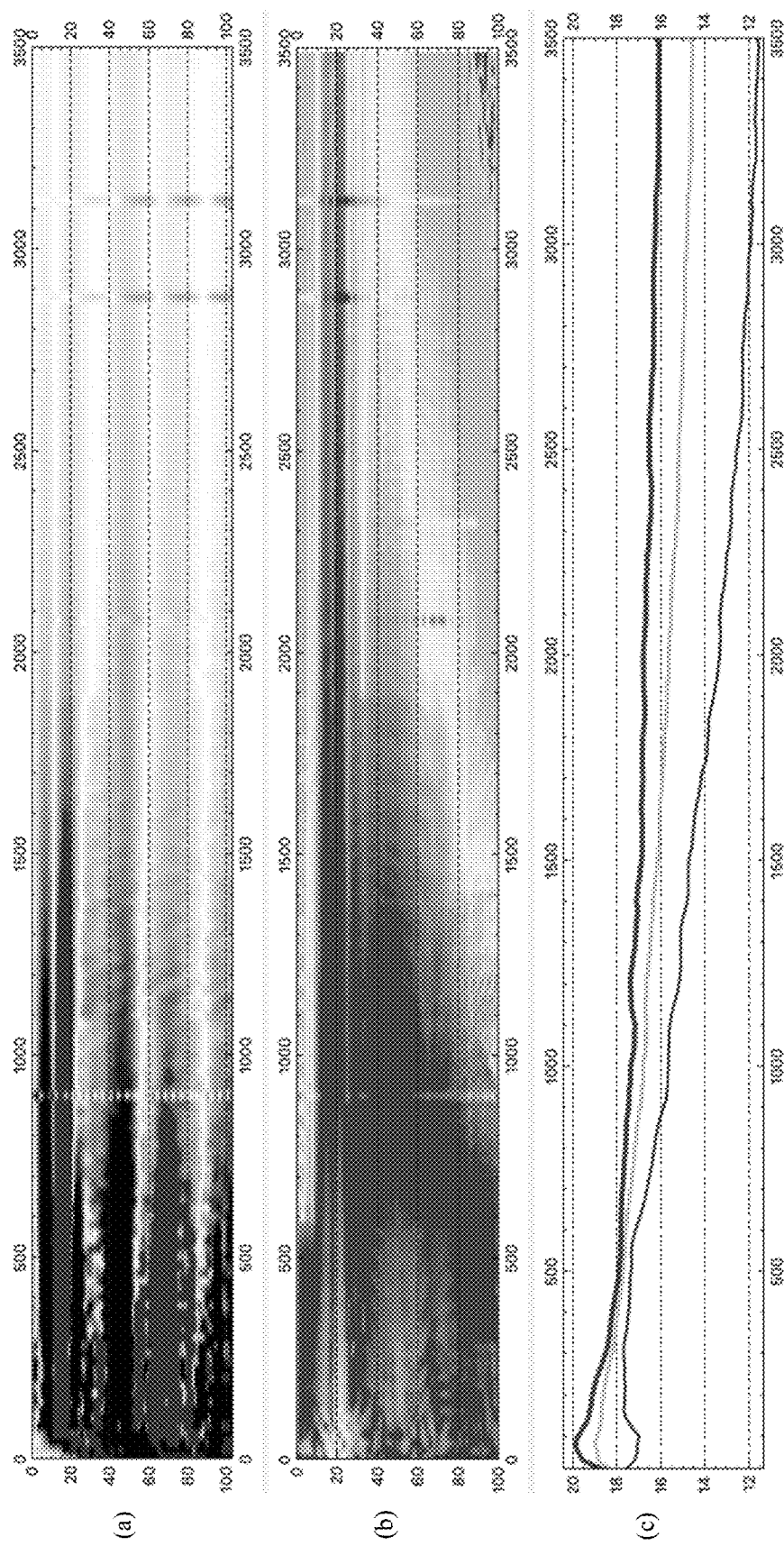
FIG. 3 is a schematic diagram of processing downgoing P-wave data according to an embodiment of the present disclosure.

Firstly, the VSP seismic wavefield data is preprocessed, i.e., downgoing P-wave data and P-wave first arrival time are obtained. Then, according to the P-wave first arrival time, flattening processing is performed on the downgoing P-wave data. FIG. 3 is a schematic diagram of processing downgoing P-wave data according to an embodiment of the present disclosure, in which vertical coordinates denote a time length, and horizontal coordinates denote a trace, which may be considered as a product of a trace number and a trace spacing. (a) in FIG. 3 shows downgoing P-wave data on which the flattening processing has performed. In this case, it is a time domain record, and the downgoing P-waves are aligned.

Next, a FFT is performed on seismic data with a preset time window length starting from the P-wave first arrival time and cut from the downgoing P-wave data on which the flattening processing has been performed, to obtain FFT transformed downgoing P-wave data, and obtaining a multi-trace downgoing P-wave log spectrum using formula (1). In this case, the multi-trace downgoing P-wave log spectrum is an updated multi-trace downgoing P-wave log spectrum, which is marked as A. (b) in FIG. 3 is a schematic diagram of a multi-trace downgoing P-wave log spectrum. Formulas (2) and (3) are adopted to calculate a slope and an intercept of the updated trace of downgoing P-wave log spectrum A. (c) in FIG. 3 marks an intercept C, and an amplitude Amax corresponding to a high cut-off frequency and an amplitude Apeak corresponding to a peak frequency of the downgoing P-wave log spectrum A in (b) of FIG. 3.

Figure 4:
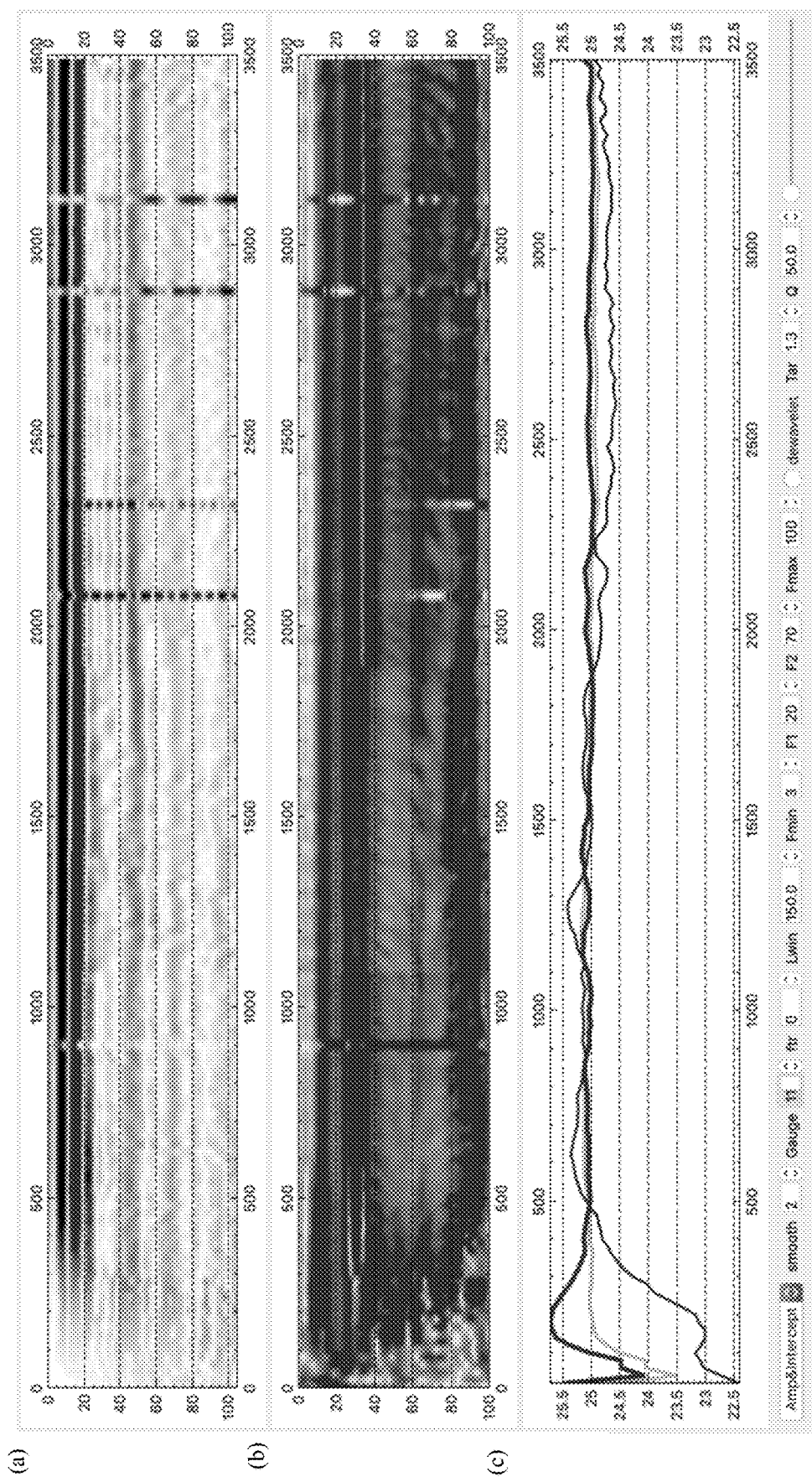
FIG. 4 is a schematic diagram of processing a flattened multi-trace downgoing P-wave log spectrum according to an embodiment of the present disclosure.

Formula (4) is adopted to perform flattening processing on the updated trace of downgoing P-wave log spectrum A. FIG. 4 is a schematic diagram of processing an updated trace of downgoing P-wave log spectrum A according to an embodiment of the present disclosure, in which vertical coordinates denote a time length, and horizontal coordinates denote a trace, which may be considered as a product of a trace number and a trace spacing. (a) in FIG. 4 shows a time domain record of an updated trace of downgoing P-wave log spectrum on which the flattening processing has been performed. (b) in FIG. 4 is a schematic diagram of a updated multi-trace downgoing P-wave log spectrum A having experienced flattening processing. (c) in FIG. 4 marks an intercept C, and an amplitude Amax corresponding to a high cut-off frequency and an amplitude Apeak corresponding to a peak frequency of the downgoing P-wave log spectrum in (b) of FIG. 4.

Figure 5:
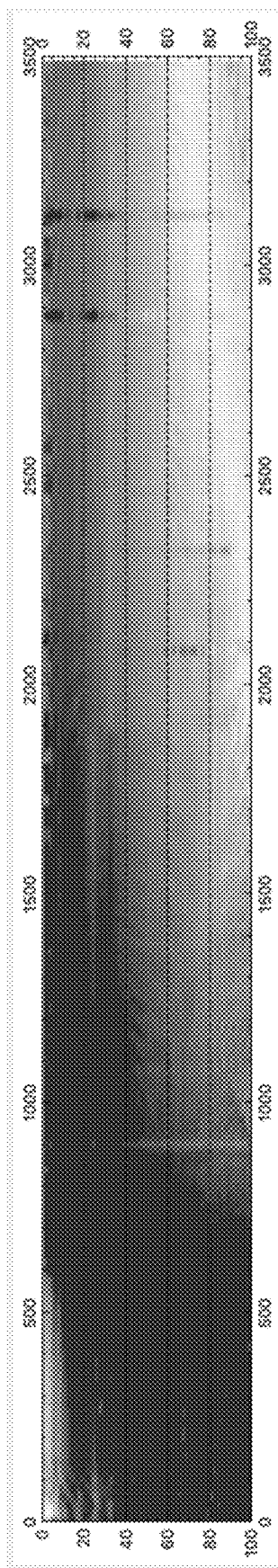
FIG. 5 is a schematic diagram of multi-trace downgoing P-wave log spectrum having been initially removed of a downgoing wavelet log spectrum according to an embodiment of the present disclosure.

The updated multi-trace downgoing P-wave log spectrum A on which the flattening processing has been performed is stacked to obtain a downgoing wavelet log spectrum; the downgoing wavelet log spectrum is subtracted from the trace of downgoing P-wave log spectrum to obtain a updated trace of downgoing P-wave log spectrum, i.e., a trace of downgoing P-wave log spectrum having been initially subtracted of the downgoing wavelet log spectrum and being marked as B. FIG. 5 is a schematic diagram of a trace of downgoing P-wave log spectrum having been initially subtracted of a downgoing wavelet log spectrum, in which vertical coordinates denote a time length, and horizontal coordinates denote a trace, which may be considered as a product of a trace number and a trace spacing. FIG. 5 assumes a peak frequency as $f_{i,peak}=20$ and $f_{i,max}=70$ to calculate a slope and an intercept of a updated trace of downgoing P-wave log spectrum B, with a principle the same as those of formulas (2) and (3):

$$G_i=(B_{i,max}-B_{i,peak})/(f_{i,max}-f_{i,peak});$$

$$C_i=B_{i,max}-G_{k,i}\cdot f_{i,max};$$

where $G_i$ is a slope of an i-th trace of downgoing P-wave log spectrum B; $C_i$ is an intercept of the i-th trace of downgoing P-wave log spectrum B; $f_{i,max}$ is a high cut-off frequency of the i-th trace of downgoing P-wave log spectrum B; $f_{i,peak}$ is a peak frequency of the i-th trace of downgoing P-wave log spectrum; B max is an amplitude corresponding to the high cut-off frequency of the i-th trace of downgoing P-wave log spectrum B; $B_{i,peak}$ is an amplitude corresponding to the peak frequency of the i-th trace of downgoing P-wave log spectrum B.

When a difference between the intercept of the updated trace of downgoing P-wave log spectrum B and the intercept of the previous trace of downgoing P-wave log spectrum A is not within a preset intercept range, or a difference between the slope of the updated trace of downgoing P-wave log spectrum B and the slope of the previous trace of downgoing P-wave log spectrum A is not within a preset slope range, the method returns to step 204 to obtain an updated B; each time, a comparison is made between the updated trace of downgoing P-wave log spectrum B and the previously iterated trace of downgoing P-wave log spectrum B, until the above differences are both within the respective preset ranges. Finally, the wavelet-corrected multi-trace downgoing P-wave log spectrum is obtained, and final $G_i$ and $C_i$ corresponding to the wavelet-corrected multi-trace downgoing P-wave log spectrum are obtained.

The real and imaginary parts of each trace of FFT transformed downgoing P-wave data are multiplied by $C_i \cdot e^{G_i f_i}$ for correction, respectively, to determine an valid frequency band of the corrected downgoing P-wave data; ramp processing is performed on data points within a preset range and outside the valid frequency band; zero-clearing processing is performed on downgoing P-wave data outside the valid frequency band and the preset range to obtain final downgoing P-wave data; and an inverse FFT is performed on the final downgoing P-wave data to obtain a downgoing wavelet.

Formula (5) is adopted to perform linear fitting on a logarithm of the P-wave first arrival time and the intercept of the wavelet-corrected multi-trace downgoing P-wave log spectrum, to determine a slope of the linear fitting as a true amplitude recovery factor.

Figure 6:
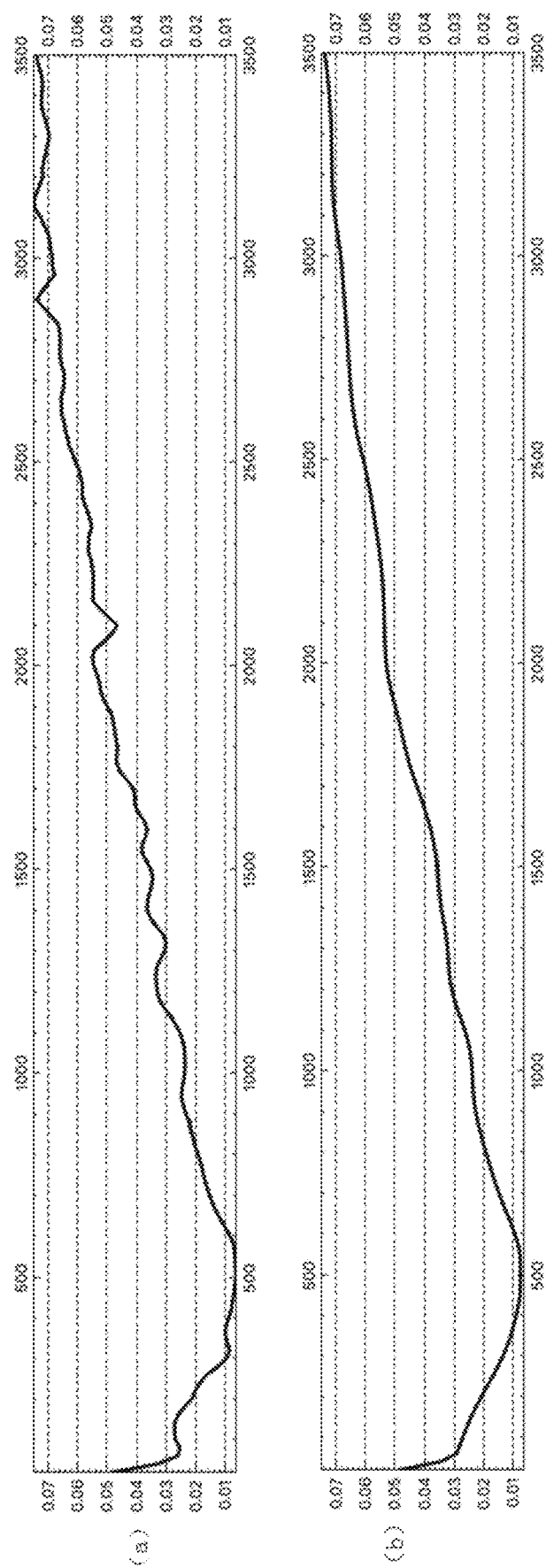
FIG. 6 is a schematic diagram of a slope of a trace of wavelet-corrected downgoing P-wave log spectrum before and after smoothing processing according to an embodiment of the present disclosure.

Formula (6) is adopted to obtain an effective Q factor corresponding to the trace based on the P-wave first arrival time and the slope of the wavelet-corrected trace of downgoing P-wave log spectrum; to ensure the stability of solution, multi-point smoothing processing should be performed on $G_i$ to ensure that $G_i$ is an increasing function along with the P-wave first arrival time $Tp_i$. FIG. 6 is a schematic diagram of a slope of wavelet-corrected trace of downgoing P-wave log spectrum for smoothing processing, in which vertical coordinates denote a time length, and horizontal coordinates denote a trace, which may be considered as a product of a trace number and a trace spacing. (a) in FIG. 6 shows a slope of the wavelet-corrected trace of downgoing P-wave log spectrum before smoothing processing, and (b) in FIG. 6 shows a slope of the wavelet-corrected trace of downgoing P-wave log spectrum after smoothing processing.

Figure 7:
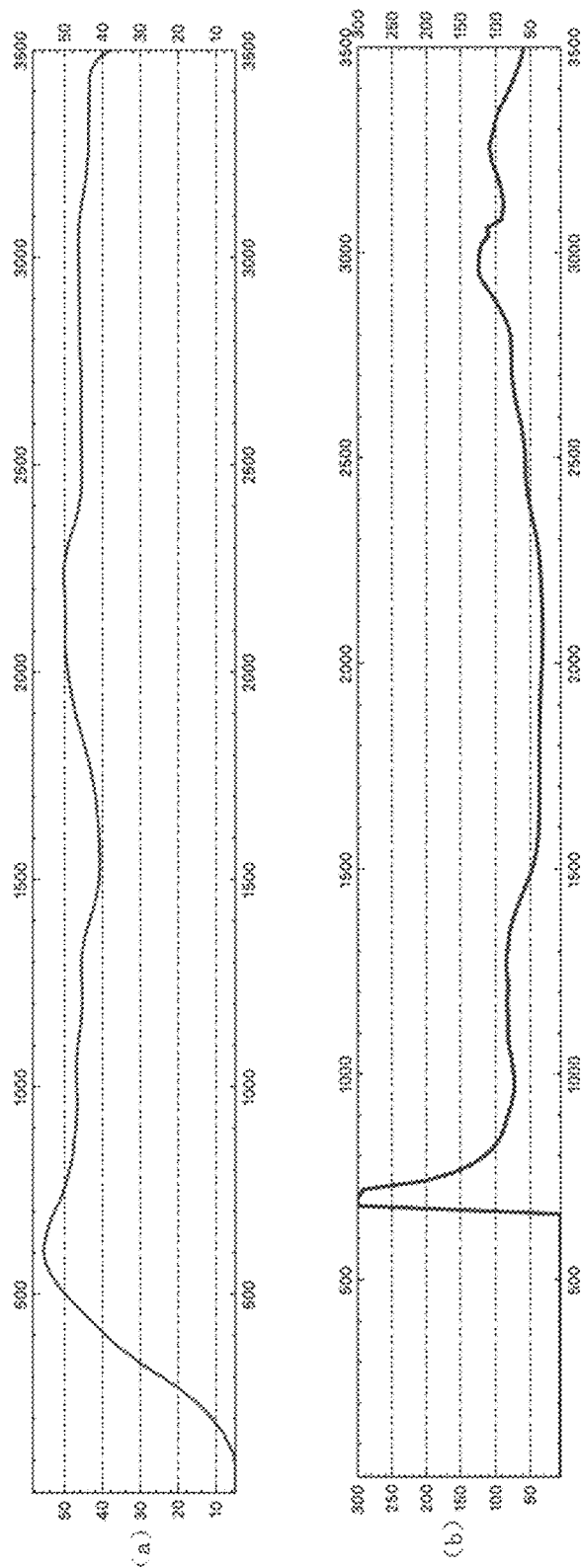
FIG. 7 is a schematic diagram of an effective Q factor and an interval Q factor corresponding to the trace obtained in an embodiment of the present disclosure.

Formula (7) is adopted to obtain an interval Q factor corresponding to the trace based on the P-wave first arrival time and the effective Q factor corresponding to the trace. FIG. 7 is a schematic diagram of an effective Q factor and an interval Q factor corresponding to the trace obtained in an embodiment of the present disclosure, in which vertical coordinates denote a time length, and horizontal coordinates denote a trace, which may be considered as a product of a trace number and a trace spacing. (a) in FIG. 7 shows an effective Q factor, and (b) in FIG. 7 shows an interval Q factor. Abnormal values before 800m is due to strong noise in VSP data.

Based on the same inventive concept, the embodiments of the present disclosure further provide an apparatus for extracting a downgoing wavelet and attenuation parameters from VSP data, as described in the following embodiments. Since the principle of technical solution of the apparatus is similar to that of the method for extracting a downgoing wavelet and attenuation parameters from VSP data, the implementation of the method may be referred to for implementation of the apparatus, and the repetitive description is omitted herein.

Figure 8:
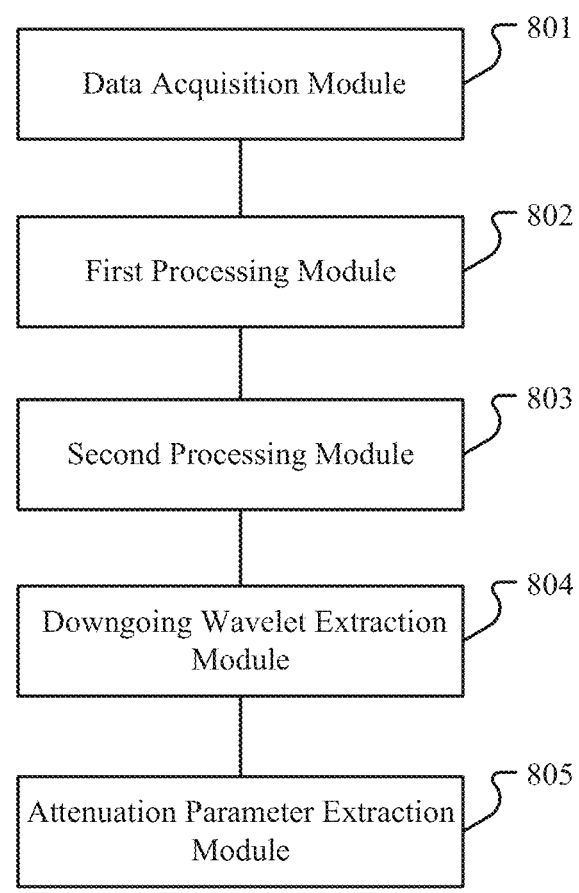
FIG. 8 is a schematic diagram of an apparatus for extracting downgoing wavelets and attenuation parameters from VSP data according to an embodiment of the present disclosure.

FIG. 8 is a schematic diagram of an apparatus for extracting a downgoing wavelet and attenuation parameters from VSP data according to an embodiment of the present disclosure. As illustrated in FIG. 8, the apparatus includes:

a data acquisition module 801 configured to pick up a P-wave first arrival based on VSP data to obtain P-wave first arrival time; and perform upgoing and downgoing P-waves separation processing on the VSP data to obtain downgoing P-wave data;

a first processing module 802 configured to perform a FFT on seismic data with a preset time window length starting from the P-wave first arrival time and cut from the downgoing P-wave data to obtain FFT transformed downgoing P-wave data, and obtain multi-trace downgoing P-wave log spectrum based on the FFT transformed downgoing P-wave data;

a second processing module 803 configured to subtract a downgoing wavelet log spectrum from the multi-trace downgoing P-wave log spectrum, to obtain a wavelet-corrected multi-trace downgoing P-wave log spectrum satisfying a preset requirement, wherein the preset requirement is that a difference between parameters obtained from the multi-trace downgoing P-wave log spectrum and parameters obtained from the wavelet-corrected multi-trace downgoing P-wave log spectrum is within a preset range, the parameters including intercept and slope;

a downgoing wavelet extraction module 804 configured to perform, based on the parameters obtained from the wavelet-corrected multi-trace downgoing P-wave log spectrum, an amplitude correction and an inverse FFT on the FFT transformed downgoing P-wave data to obtain a downgoing wavelet; and an attenuation parameter extraction module 805 configured to obtain attenuation parameters based on P-wave first arrival time and the parameters obtained from the wavelet-corrected multi-trace downgoing P-wave log spectrum, the attenuation parameters including true amplitude recovery factor and Q factor.

In one embodiment, the apparatus further includes a flattening third processing module configured to:

perform flattening processing on the downgoing P-wave data according to the P-wave first arrive time;

the first processing module 802 is specifically configured to:

perform a FFT on seismic data with a preset time window length starting from the P-wave first arrival time and cut from the downgoing P-wave data on which the flattening processing has been performed.

In one embodiment, the second processing module 803 is specifically configured to:

perform flattening processing on each current trace of the multi-trace downgoing P-wave log spectrum using the intercept and the slope parameter to obtain flattened multi-trace downgoing P-wave log spectrum;

stack the flattened multi-trace downgoing P-wave log spectrum to obtain a downgoing wavelet log spectrum;

subtract the downgoing wavelet log spectrum from each current trace of downgoing P-wave log spectrum, to obtain an updated trace of downgoing P-wave log spectrum; and replace the current trace of downgoing P-wave log spectrum with the updated trace of downgoing P-wave log spectrum if a difference between parameters of the updated trace of downgoing P-wave log spectrum and parameters of the current trace of downgoing P-wave log spectrum is not within a preset range; iteratively perform the above steps until the difference between the parameters of the updated trace of downgoing P-wave log spectrum and the parameters of the current trace of downgoing P-wave log spectrum is within the preset range; and determine a final multi-trace downgoing P-wave log spectrum as the wavelet-corrected multi-trace downgoing P-wave log spectrum In one embodiment, the downgoing wavelet extraction module 804 is specifically configured to:

correct, based on the parameter of the wavelet-corrected multi-trace downgoing P-wave log spectrum, real and imaginary parts of the FFT transformed downgoing P-wave data, to obtain corrected downgoing P-wave data;

determine a valid frequency band of the corrected downgoing P-wave data;

perform ramp processing on data points within a preset range and outside the valid frequency band;

perform zero-clearing processing on downgoing P-wave data outside the valid frequency band and the preset range to obtain final downgoing P-wave data; and perform an inverse FFT on the final downgoing P-wave data to obtain a downgoing wavelet.

In one embodiment, the attenuation parameters extraction module 805 is specifically configured to:

determine the true amplitude recovery factor based on the P-wave first arrival time and the intercept of the wavelet-corrected multi-trace downgoing P-wave log spectrum; and obtain the Q factor based on the P-wave first arrival time and the slope of the wavelet-corrected multi-trace downgoing P-wave log spectrum.

In one embodiment, the attenuation parameters extraction module 805 is specifically configured to:

perform linear fitting on a logarithm of the P-wave first arrival time and the intercept of the wavelet-corrected multi-trace downgoing P-wave log spectrum, to determine a slope of the linear fitting as the true amplitude recovery factor.

In one embodiment, the Q factor includes an effective Q factor and an interval Q factor;

the attenuation parameters extraction module 805 is specifically configured to:

obtain the effective Q factor corresponding to the trace based on the P-wave first arrival time and the slope of the wavelet-corrected downgoing P-wave log spectrum; and obtain the interval Q factor corresponding to the trace based on the P-wave first arrival time and the effective Q factor corresponding to the trace.

The embodiments of the present disclosure further provide a computer device, including a memory, a processor and a computer program stored in the memory and executable on the processor, in which the processor is configured to executed the computer program to implement the method for extracting a downgoing wavelet and attenuation parameters from VSP data.

The embodiments of the present disclosure further provide a computer readable storage medium which stores a computer program for implementing the method for extracting a downgoing wavelet and attenuation parameters from VSP data.

To sum up, in the method and the apparatus proposed by the embodiments of the present disclosure, a P-wave first arrival is picked up from VSP data to obtain P-wave first arrival time; upgoing and downgoing P-waves separation processing is performed on the VSP data to obtain downgoing P-wave data; a FFT is performed on seismic data with a preset time window length starting from the P-wave first arrival time and cut from the downgoing P-wave data to obtain FFT transformed downgoing P-wave data, and a multi-trace downgoing P-wave log spectrum is obtained based on the FFT transformed downgoing P-wave data; a downgoing wavelet log spectrum is subtracted from the multi-trace downgoing P-wave log spectrum to obtain a wavelet-corrected multi-trace downgoing P-wave log spectrum satisfying a preset requirement, the preset requirement being that a difference between parameters of the multi-trace downgoing P-wave log spectrum and parameters of the wavelet-corrected multi-trace downgoing P-wave log spectrum is within a preset range, the parameters including an intercept and a slope; based on the parameters of the wavelet-corrected downgoing P-wave log spectrum, a correction and an inverse FFT are performed on the FFT transformed downgoing P-wave data to obtain a downgoing wavelet; and attenuation parameters are obtained based on P-wave first arrival time and the parameters of the wavelet-corrected multi-trace downgoing P-wave log spectrum, the attenuation parameters including a true amplitude recovery factor and a Q factor. In the above process, the downgoing wavelet log spectrum is subtracted from the downgoing P-wave log spectrum, that is, the obtained wavelet-corrected multi-trace downgoing P-wave log spectrum is not affected by the downgoing wavelet, so that the attenuation parameters are not affected by the downgoing wavelet, thus improving the accuracy of the attenuation parameters. In addition, when the difference between the parameters of the multi-trace downgoing P-wave log spectrum and the parameters of the wavelet-corrected multi-trace downgoing P-wave log spectrum is within the preset range, the parameters of the wavelet-corrected multi-trace downgoing P-wave log spectrum are converged. Therefore, obtaining the downgoing wavelet based on the parameters of the wavelet-corrected multi-trace downgoing P-wave log spectrum is equivalent to compensating for the downgoing wavelet, which also improves the accuracy of the downgoing wavelet.

Those skilled in the art should appreciate that any embodiment of the present disclosure can be provided as a method, a system, or a computer program product. Therefore, the present disclosure can take the form of a full hardware embodiment, a full software embodiment, or an embodiment combining software and hardware. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or a block diagram of the method, device (system) and computer program product according to the embodiments of the present disclosure. It should be appreciated that each flow and/or block in the flow diagram and/or the block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto a computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above specific embodiments have further explained the objectives, technical solutions and advantageous effects of the present disclosure in detail. It should be appreciated that those described above are just specific embodiments of the present disclosure, and are not intended to limit the protection scope of the present disclosure. Any modification, equivalent substitution, improvement, etc. made within the spirit and principle of the present disclosure should fall within the protection scope of the present disclosure.

The invention claimed is:

1. A method for extracting a downgoing wavelet and attenuation parameters from VSP data, comprising:
   collecting VSP data by placing a three-component or single-component sensor into a well for a seismic wave reception, and using an explosion source or an vibroseis on surface or in the well for a seismic wave excitation near a wellhead;
   picking up, by a processor, a P-wave first arrival from the VSP data to obtain P-wave first arrival time;
   performing, by the processor, upgoing and downgoing P-waves separation processing on the VSP data to obtain downgoing P-wave data;
   performing, by the processor, a FFT on seismic data with a preset time window length starting from the P-wave first arrival time and cut from the downgoing P-wave data to obtain FFT transformed downgoing P-wave data, and obtaining a multi-trace downgoing P-wave log spectrum based on the FFT transformed downgoing P-wave data;

subtracting, by the processor, a downgoing wavelet log spectrum from the multi-trace downgoing P-wave log spectrum, to obtain a wavelet-corrected multi-trace downgoing P-wave log spectrum satisfying a preset requirement, the preset requirement being that a difference between parameters obtained from the multi-trace downgoing P-wave log spectrum and parameters obtained from the wavelet-corrected multi-trace downgoing P-wave log spectrum is within a preset range, the parameters including intercept and slope;

performing, by the processor and based on the parameters obtained from the wavelet-corrected multi-trace downgoing P-wave log spectrum, an amplitude correction and an inverse FFT on the FFT transformed downgoing P-wave data to obtain a downgoing wavelet; and obtaining, by the processor, attenuation parameters based on the P-wave first arrival time and the parameters obtained from the wavelet-corrected multi-trace downgoing P-wave log spectrum, the attenuation parameters including true amplitude recovery factor and Q factor;

performing, by the processor, deconvolution, amplitude recovery and inverse Q filtering on the VSP seismic data based on the downgoing wavelet, the true amplitude recovery factor and the Q factor, to obtain a seismic image; and supporting geological interpretation and oil and gas development with the seismic image.

2. The method for extracting a downgoing wavelet and attenuation parameters from VSP data according to claim 1, further comprising:

performing flattening processing on the downgoing P-wave data according to the P-wave first arrive time;

performing the FFT on seismic data with a preset time window length starting from the P-wave first arrival time and cut from the downgoing P-wave data, comprising:

performing a FFT on seismic data with a preset time window length starting from the P-wave first arrival time and cut from the downgoing P-wave data on which the flattening processing has been performed.

3. The method for extracting a downgoing wavelet and attenuation parameters from VSP data according to claim 1, wherein subtracting the downgoing wavelet log spectrum from the multi-trace downgoing P-wave log spectrum, to obtain the wavelet-corrected multi-trace downgoing P-wave log spectrum, comprising:

performing flattening processing on each current trace of the multi-trace downgoing P-wave log spectrum using the intercept and the slope to obtain flattened multi-trace downgoing P-wave log spectrum;

stacking the flattened multi-trace downgoing P-wave log spectrum to obtain a downgoing wavelet log spectrum;

subtracting the downgoing wavelet log spectrum from each current trace of downgoing P-wave log spectrum, to obtain an updated trace of downgoing P-wave log spectrum; and replacing the current trace of downgoing P-wave log spectrum with the updated trace of downgoing P-wave log spectrum if a difference between parameters of the updated trace of downgoing P-wave log spectrum and parameters of the current trace of downgoing P-wave log spectrum is not within a preset range; iteratively performing the above steps until the difference between the parameters of the updated trace of downgoing P-wave log spectrum and the parameters of the current trace of downgoing P-wave log spectrum is within the preset range; and determining a final multi-trace downgoing P-wave log spectrum as the wavelet-corrected multi-trace downgoing P-wave log spectrum.

4. The method for extracting a downgoing wavelet and attenuation parameters from VSP data according to claim 1, wherein performing, based on the parameters obtained from the wavelet-corrected multi-trace downgoing P-wave log spectrum, the amplitude correction and the inverse FFT on the FFT transformed downgoing P-wave data to obtain the downgoing wavelet, comprising:

correcting, based on the parameters of the wavelet-corrected multi-trace downgoing P-wave log spectrum, real and imaginary parts of the FFT transformed downgoing P-wave data, to obtain corrected downgoing P-wave data;

determining a valid frequency band of the corrected downgoing P-wave data;

performing ramp processing on data points within a preset range and outside the valid frequency band;

performing zero-clearing processing on downgoing P-wave data outside the valid frequency band and the preset range to obtain final downgoing P-wave data; and performing an inverse FFT on the final downgoing P-wave data to obtain a downgoing wavelet.

5. The method for extracting a downgoing wavelet and attenuation parameters from VSP data according to claim 1, wherein obtaining attenuation parameters based on the P-wave first arrival time and the parameters obtained from the wavelet-corrected multi-trace downgoing P-wave log spectrum, comprising:

determining the true amplitude recovery factor based on the P-wave first arrival time and the intercept of the wavelet-corrected multi-trace downgoing P-wave log spectrum; and obtaining the Q factor based on the P-wave first arrival time and the slope of the wavelet-corrected multi-trace downgoing P-wave log spectrum.

6. The method for extracting a downgoing wavelet and attenuation parameters from VSP data according to claim 5, wherein determining the true amplitude recovery factor based on the P-wave first arrival time and the intercept of the wavelet-corrected multi-trace downgoing P-wave log spectrum, comprising:

performing linear fitting on a logarithm of the P-wave first arrival time and the intercept of the wavelet-corrected multi-trace downgoing P-wave log spectrum, to determine a slope of the linear fitting as the true amplitude recovery factor.

7. The method for extracting a downgoing wavelet and attenuation parameters from VSP data according to claim 5, wherein the Q factor comprises an effective Q factor and an interval Q factor;

obtaining the Q factor based on the P-wave first arrival time and the slope of the wavelet-corrected multi-trace downgoing P-wave log spectrum, comprising:

obtaining the effective Q factor corresponding to the trace based on the P-wave first arrival time and the slope of the wavelet-corrected downgoing P-wave log spectrum;

obtaining the interval Q factor corresponding to the trace based on the P-wave first arrival time and the effective Q factor corresponding to the trace.

8. A computer device, comprising a memory, a processor and a computer program stored in the memory and executable on the processor, wherein the processor is configured to execute the computer program to implement the method according to claim 1.

9. An apparatus for extracting a downgoing wavelet and attenuation parameters from VSP data, comprising:
- an explosion source or an vibroseis on surface or in a well used for a seismic wave excitation near a wellhead;
- a three-component or single-component sensor placed into a well for a seismic wave reception to collect VSP data;
- a data acquisition module configured to pick up a P-wave first arrival based on VSP data to obtain P-wave first arrival time, and perform upgoing and downgoing P-waves separation processing on the VSP data to obtain downgoing P-wave data;
- a first processing module configured to perform a FFT on seismic data with a preset time window length starting from the P-wave first arrival time and cut from the downgoing P-wave data to obtain FFT transformed downgoing P-wave data, and obtain a multi-trace downgoing P-wave log spectrum based on the FFT transformed downgoing P-wave data;
- a second processing module configured to subtract a downgoing wavelet log spectrum from the multi-trace downgoing P-wave log spectrum, to obtain a wavelet-corrected multi-trace downgoing P-wave log spectrum satisfying a preset requirement, wherein the preset requirement is that a difference between parameters obtained from the multi-trace downgoing P-wave log spectrum and parameters obtained from the wavelet-corrected multi-trace downgoing P-wave log spectrum is within a preset range, the parameters including intercept and slope;
- a downgoing wavelet extraction module configured to perform, based on the parameters obtained from the wavelet-corrected multi-trace downgoing P-wave log spectrum, an amplitude correction and an inverse FFT on the FFT transformed downgoing P-wave data to obtain a downgoing wavelet; and
- an attenuation parameter extraction module configured to obtain attenuation parameters based on the P-wave first arrival time and the parameters obtained from the wavelet-corrected multi-trace downgoing P-wave log spectrum, the attenuation parameters including true amplitude recovery factor and Q factor.

* * * * *